Feb. 23, 1926.  
W. J. O'LEARY  
1,573,852  
HIGH FREQUENCY OSCILLATION DEVICE  
Filed April 5, 1920  3 Sheets-Sheet 1

Inventor  
William J. O'Leary  
By his Attorney  
George Ramsey

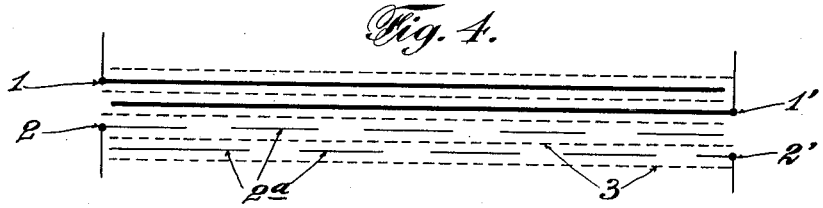
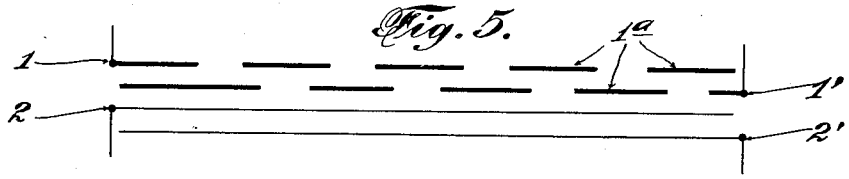
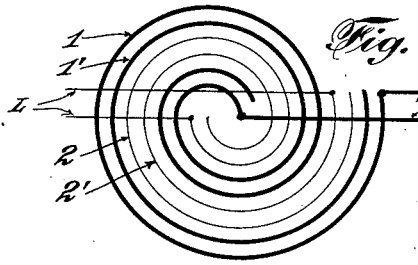 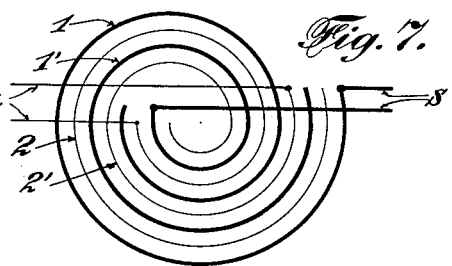
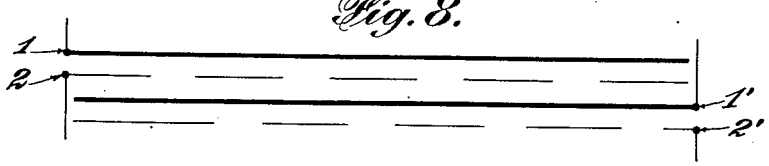
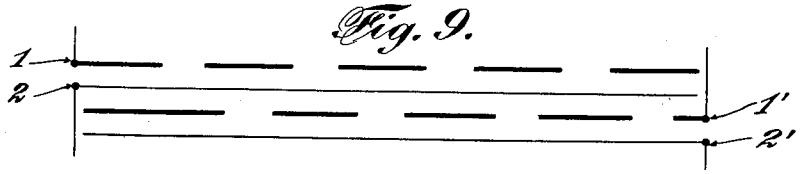
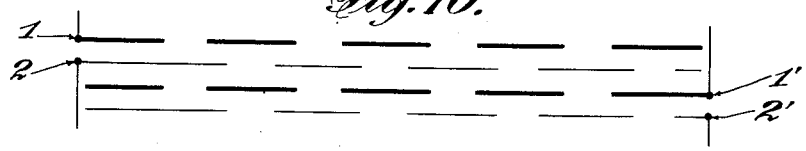

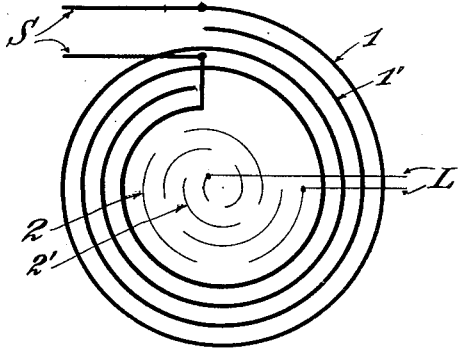
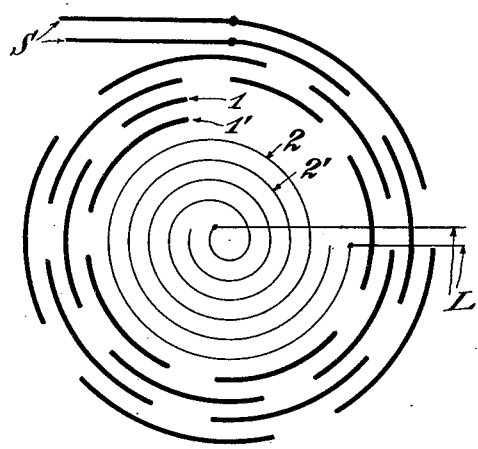
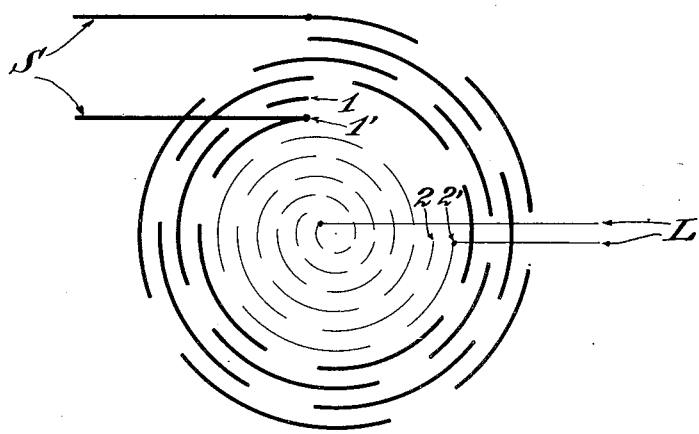

Patented Feb. 23, 1926.

1,573,852

UNITED STATES PATENT OFFICE.

WILLIAM J. O'LEARY, OF MONTREAL, QUEBEC, CANADA.

HIGH-FREQUENCY-OSCILLATION DEVICE.

Application filed April 5, 1920. Serial No. 371,537.

*To all whom it may concern:*

Be it known that I, WILLIAM J. O'LEARY, a subject of the King of England, residing at Montreal, Dominion of Canada, have invented new and useful Improvements in High-Frequency-Oscillation Devices, of which the following is a specification.

This invention relates to electrical apparatus, and pertains particularly to improvements in apparatus for the production of a form of electrical energy characterized by high frequency oscillations and suitable for employment in a variety of applications.

One object of the invention is the provision of an improved form of coupling device or transforming device which will produce a form of electrical energy characterized by an extremely high frequency.

Another object of the invention is the provision of such an apparatus which will produce an extremely high frequency apparently without loss of quantity.

A still further object of the invention is the provision of an apparatus which in itself maintains a proper balance between inductance and capacity.

A further object of the invention is the improvement upon similar prior devices for the purpose of providing a simple and inexpensive apparatus which may be readily varied in construction to produce a current having a desired high frequency of oscillation.

Other and further objects of the invention will be pointed out hereafter or will be obvious upon an understanding of the invention, and various additional advantages of the novel structure claimed will be developed with experience in the use of the apparatus.

Described generally, the present invention resides in certain features of construction of a high frequency coupling or transforming device of a type employing primary and secondary elements in the nature of conductors associated in inductive relationship such that they partake of the electrostatic attributes of a condenser as well as the electromagnetic characteristics of a transformer. In certain particulars, the invention constitutes an improvement upon that disclosed in the copending application of Leslie R. McDonald, S. N. 168,916, filed May 16, 1917, now Patent No. 1,389,255, wherein a pair of continuous spirally convoluted primary conductors are inductively associated with a pair of continuous spirally convoluted secondary conductors, the successive convolutions of the primary conductors being juxtaposed and separated by insulating material, and the successive convolutions of the secondary conductors being likewise juxtaposed and insulated, and one of the pairs of conductors, either the primary or the secondary, being encompassed substantially in its entirety by the other pair. The present invention involves certain structural changes in the device just referred to, said structural changes comprising (1) the construction of one or both of the conductors as a composite element made up of separate insulated members disposed in inductive associations; (2) the relative disposal of the primary and secondary elements in such fashion that they are spirally convoluted together in inductive relationship, each encompassing portions of the other.

The several features of construction involved in the present invention will be more definitely understood by reference to the accompanying drawings forming a part of this specification and in which Figure 1 represents a diagrammatic plan view of one embodiment of the invention, in which form each of the several conductors is constituted of a plurality of separately insulated members;

Figures 4 and 5 are diagrammatic layouts illustrating the relative disposal and forms of the conductors in different embodiments of the invention;

Figures 6 and 7 are diagrammatic plans illustrating other arrangements of the conductors comprised in my invention, while Figures 8, 9, 10, and 13 are still other layout diagrams, and Figures 11 and 12 are other plan diagrams, each illustrating one of several diverse embodiments of the invention.

Figure 1:
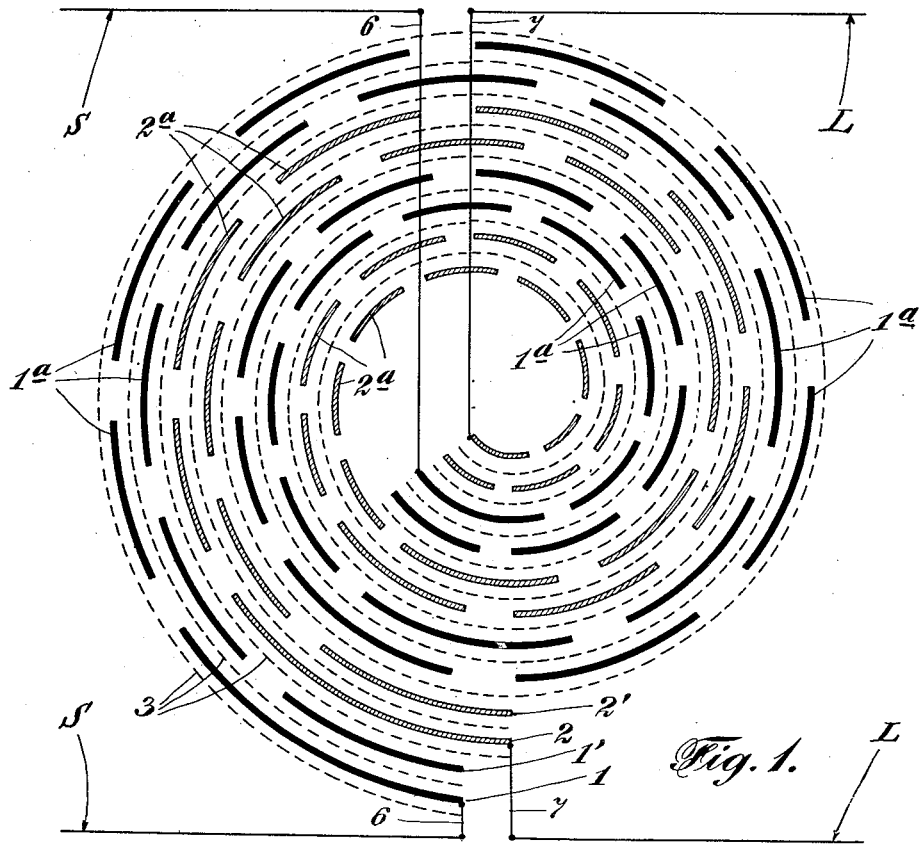

Referring first to Figure 1, it will be understood that the device therein shown includes a primary element composed of a pair of associated primary conductors made up of separately insulated members disposed in spirally convoluted series. One of these composite primary conductors is designated by the reference character 1 and the other by the reference character 1' while the respective members of which these composite conductors are formed are designated by the reference character 1ª. The members 1ª may be formed of plates of copper or other proper electrical material suitably supported in inductive relationship in proper insulating material, which is diagrammatically illustrated by the dotted line designated by the reference numeral 3. The members 1ª may be disposed in overlapping relationship, as one disposal for deriving a condenser action. The outer terminal of one of said elements and the inner terminal of the other of said elements are arranged for connection in a suitable oscillatory circuit designated by the reference character S.

Figure 2:
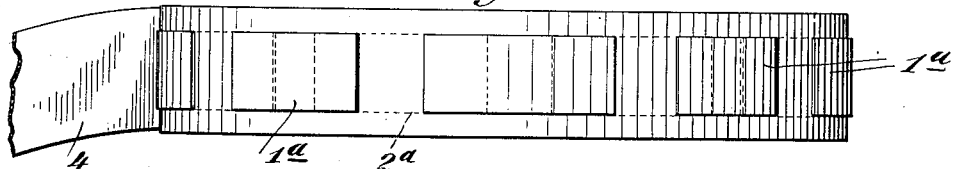
Figure 2 is a detail in the nature of a side or elevational view of one form of the device illustrating a possible construction.

Inductively associated with the primary element in the construction illustrated in Figure 1 is a secondary element comprising a pair of associated secondary conductors designated by the reference characters 2 and 2', said conductors being compositely formed of separately insulated members 2ª disposed in convoluted spiral series and in the relationship above mentioned with respect to the members 1ª. The outer terminal of one of said secondary conductors, and the inner terminal of the other, are arranged for connection in the intended work circuit L. The relative disposal of the primary and secondary elements is such that they constitute the alternate convolutions in the spiral, as though in the formation of the device they had originally been laid flat one upon the other and then rolled together into the convoluted form. One manner in which a device embodying the invention may be constructed is illustrated in Figure 2, wherein the insulating material 4 is illustrated as sheets of mica upon which the members 1ª and 2ª are supported and maintained in proper relationship. Obviously, there are many other ways in which the device may be constructed.

Figure 3:
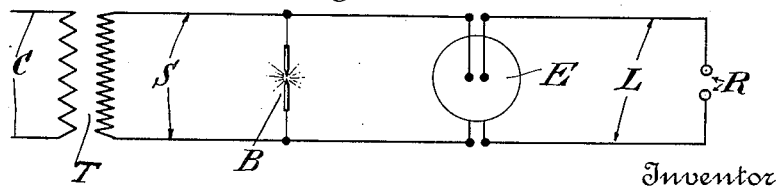
Figure 3 is a diagrammatic illustration of a system in which a device embodying the present inventions may be utilized.

In Figure 3 is illustrated diagrammatically a system in which the device may be employed, the same including a source of alternating current supply designated by the character C, which is rendered effective through the transformer T upon the oscillation circuit S, current variations in which are produced by a suitable means, diagrammatically illustrated by the arc B.

The diagrammatic element designated by the reference character E is intended to illustrate the disposal of a device embodying my invention, wherein it forms a coupling or inductive connection between the oscillation circuit S and the work circuit L, by which latter circuit the resulting high frequency energy is distributed to any desired utilizing or translating device, diagrammatically illustrated at R. In operation, the energy from the supply circuit C may be suitably modified by means of the transformer T to be adapted to the purposes of the oscillation circuit S, wherein it is further modified by the operation of the current-varying element B, to produce a condition of high frequency oscillation, in which condition the current is impressed upon the conductors 1—1' of the primary element of the device E. By virtue of the relationship of the members 1ª constituting the conductors of the primary element in the embodiment illustrated in Figure 1, said conductors are charged interdependently through what I believe to be the combined action of electrostatic and electromagnetic fields inductively imposed by the members 1ª upon one another. The secondary element comprising the composite conductors 2 and 2', by virtue of their inductive association with the primary element, and their interlamination between the convolutions thereof, are likewise intimately subjected to the combined action of the electrostatic and electromagnetic fields of the primary element, with the result that a form of electrical energy of almost incalculably high frequency of oscillation is produced in them, and from them impressed upon the work circuit L through the mutually interdependent inductive association of the members 2ª. A number of features of the construction illustrated in Figure 1 contributes to the production of a high frequency oscillation not obtained with prior devices with which I am familiar, as well as to the reduction of loss to an entirely negligible amount. One of said features is the construction of the elements of individually insulated inductively associated members or sections, and the effect of such construction is maintained, in varying degrees, independently of the manner in which the elements so constructed are associated with the other elements of the device; such for example as where the secondary element alone is of such construction, as illustrated in Figure 4, where the primary element alone is of such construction as illustrated in Figure 5, where a conductor of the other element is interposed between the composite element as illustrated in Figures 8, 9, and 10, or where one element is encompassed in its entirety by the other, as illustrated in Figures 11, 12 and 13.

Another feature of the construction to which the improved result is in a measure attributable is the interlaminating or interposing of the different elements in juxtaposed convolutions throughout substantially their entire extent, as brought out most clearly in the diagrammatic Figures 6 and 7. The advantages of this feature of the invention are present in the divers variations of construction, some of which are illustrated in Figures 1 to 10 inclusive, Figure 7 showing the conductors of the respective elements alternating, Figure 6 showing the conductors alternating in pairs, and the other figures mentioned showing various alterations of the conductors with one or the other or both thereof of the composite construction.

While explanation of the operation of the device and possible reasons for the new results obtained by it may be offered, based on different theories, I do not propose to limit the invention to any particular theory of operation, and such explanation of the operation of the device as is offered herein is presented for the purpose of illustration and is representative of what I now believe to be attributable factors of the result. I conceive that the construction of the conductors as composite elements of separately insulated members, augments the conductance of the respective circuits. The association of the several insulated members 1$^a$ and 2$^a$ with one another has the effect of a great number of small condensers connected in series. This arrangement, while increasing the potential of the discharge from the composite condensers, quickens both the charging and the discharging functions, and thereby produces a great increase in the periodicity of the energy imposed upon the work circuit. This sub-division of the elements into a plurality of condensers also affords a method for varying the capacity without varying the inductive effect, as the greater the sub-division of the elements, the smaller will be their condenser capacity. Accordingly, in the construction of a device any desired capacity may be obtained in either the primary circuit or the secondary circuit. I conceive also, that the interlaminating of the primary and secondary elements, and the spiral convoluting thereof, is effective both to heighten the mutual inductive efficiency of the elements, to increase their capacity or condenser effect and to increase the periodicity of the energy at the terminals of the secondary. These results may be attributed to the compounding or multiplying effect of each of the several convolutions upon the others. At any rate, whatever the theory which may be advanced or accepted for the operation of the device, the results which it produces in the form of electric energy are charcaterized by a great increase in frequency, even over that of the McDonald apparatus above mentioned, and a reduction in quantity loss to a point where it cannot be detected. The resulting energy demonstrates phenomena which are distinctly novel and surprising, and in addition to being useful in many applications in present practice, offers surprising possibilities of new uses.

It is apparent to one skilled in the art that the device itself possesses the greatest simplicity both in structure and use, and these factors contribute both to low initial cost and small cost of operation.

While I have illustrated herein a variety of forms in which various features of the invention hereinafter claimed may be embodied, it is to be undersood that such several forms, both individually and collectively, are presented simply for the purpose of illustration, and are not shown for the purpose of exhausting the range of variation of the invention, or of limiting it to the several arrangements or variations shown.

Having thus described my invention, what I claim is:

1. A device for modifying electrical energy comprising primary and secondary inductive elements formed of segmented conductors separately insulated, with conductors of the primary and secondary elements alternating in juxtaposition and disposed in spiral convolutions.

2. A device for modifying the form of electrical energy comprising primary and secondary inductive elements including separately insulated segmented conductors disposed in condenser relationship, conductors of the different elements being disposed alternately in juxtaposition, and one of said elements offering an open circuit to direct current.

3. A device for modifying electrical energy comprising primary and secondary inductive elements of sheet form, the respective elements being segmented and arranged alternately in juxtaposition and the elements being spirally convoluted.

4. A device for modifying the form of electrical energy comprising primary inductive elements and secondary inductive elements, each made up of separately insulated segmented conductors of sheet form with portions of the respective conductors disposed in convolutions about a common axis.

5. A device for modifying the form of electrical energy comprising primary inductive elements and secondary inductive elements each made up of separately insulated conductors of sheet form severed transversely to form a plurality of segmented portions with the segmented portions of the conductors of respective elements disposed in convolutions about a common axis.

6. In a device for modifying the form of electrical energy, the combination of a convoluted primary element comprising a series of metallic plates placed end to end and insulated from each other, a similar primary element convoluted within said other primary element and a secondary element convoluted about said primary elements.

7. In a device for modifying the form of electrical energy, the combination of a convoluted primary element comprising a series of metallic plates placed end to end and insulated from each other, and a similar primary element convoluted within said other primary element, and a pair of secondary elements similar to said primary elements convoluted about said primary elements and insulated therefrom.

8. In a device for modifying the form of electrical energy, the combination of a primary element comprising a strip of mica, having a series of metallic plates thereon, and a secondary element similar to said primary element, said secondary and primary elements being juxtaposed and disposed in a spiral convolution.

9. In a device for modifying the form of electrical energy, the combination of a pair of primary elements, each comprising a strip of mica having a series of metallic plates thereon insulated from each other and a pair of secondary elements similar to said primary elements, said primary and secondary elements alternating in juxtaposition and being disposed in spiral convolutions.

10. In a device of the class described, the combination of primary and secondary elements, one of said elements comprising segmented conductors separately insulated, said primary and secondary elements being in alternate juxtaposition and disposed in spiral convolutions.

11. In a device for modifying the form of electrical energy, the combination of a pair of segmented primary elements insulated from each other and juxtaposed, a pair of secondary elements likewise segmented and juxtaposed, said primary and secondary elements being disposed in spiral convolution with said pair of primary elements alternating with said pair of secondary elements.

WILLIAM J. O'LEARY.